(12) United States Patent
Masaki et al.

(10) Patent No.: US 7,858,201 B2
(45) Date of Patent: Dec. 28, 2010

(54) TITANIUM OXIDE PHOTOCATALYST, METHOD FOR PRODUCING SAME AND USE THEREOF

(75) Inventors: Yasuhiro Masaki, Osaka (JP); Tadashi Fukuda, Gobo (JP); Katsuhiro Nishihara, Amagasaki (JP); Rie Katsui, Hirakata (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/057,983

(22) Filed: Mar. 28, 2008

(65) Prior Publication Data

US 2008/0268268 A1   Oct. 30, 2008

Related U.S. Application Data

(63) Continuation of application No. PCT/JP2006/319286, filed on Sep. 28, 2006.

(30) Foreign Application Priority Data

Sep. 29, 2005   (JP) ............... 2005-285467

(51) Int. Cl.
*B32B 15/04* (2006.01)
*B01J 23/00* (2006.01)
*B01J 21/00* (2006.01)

(52) U.S. Cl. .............. 428/469; 428/702; 502/351; 502/349; 502/350; 502/242; 502/246; 502/249; 502/353

(58) Field of Classification Search .......... None
See application file for complete search history.

(56) References Cited

U.S. PATENT DOCUMENTS

| | | | | |
|---|---|---|---|---|
| 2002/0077251 | A1* | 6/2002 | Okusako et al. | 502/350 |
| 2002/0169076 | A1* | 11/2002 | Takeshi et al. | 502/350 |
| 2005/0227008 | A1* | 10/2005 | Okada et al. | 427/372.2 |
| 2005/0266235 | A1* | 12/2005 | Nakajima et al. | 428/336 |

FOREIGN PATENT DOCUMENTS

| | | | |
|---|---|---|---|
| EP | 1504816 | * | 3/2005 |
| JP | 09262482 | A1 | 7/1997 |
| JP | 2001205103 | A1 | 7/2001 |
| JP | 2003073820 | A | 12/2003 |
| JP | 2004130188 | A | 4/2004 |
| JP | 2004275999 | A1 | 7/2004 |
| JP | 2004043282 | A1 | 12/2004 |
| WO | 01/10552 | A1 | 2/2001 |
| WO | WO03/080244 | * | 10/2005 |

OTHER PUBLICATIONS

S. Neeraj et al., "A new route for the synthesis of open-framework metal phosphates using organophosphates", Chem. Commun., 2001, 2716-2717, first published as an Advance Article on the web Dec. 6, 2001.
Antonio Gulino et al., "Low-Temperature Stabilization of Tetragonal Zirconia by Bismuth", Chem. Mater. 1996, 8, 1287-1291.
W.F. Yao et al., "Sillenites materials as novel photocatalysts for methyl orange decomposition", Chemical Physics Letters 377 (2003) 501-506.
Shinri Sato, "Photocatalytic Activity of NOx-Doped TiO2 in the Visible Light Region", Chemical Physics Letters, vol. 123, No. 1,2; Jan. 3, 1986, 126-128.
X. H. Xu et al., "Preparation and characterization of Bi-doped TiO2 photocatalyst", Journal of Materials Science Letters, 21, 2002, 1655-1656.
Vineet S. Dharmadhikari et al., "Characterisation of Thin Films of Bismuth Oxide by X-Ray Photoelectron Spectroscopy", Journal of Electron Spectroscopy and Related Phenomena, 25 (1982) 181-189, Elsevier Scientific Publishing Company, Amsterdam.
Hiroyuka Noda et al., "Perparation of Titanium (IV) Oxides and its Characterisation", Journal of Japan Chemical Society, 1986 (8), p. 1084-1090z.

* cited by examiner

*Primary Examiner*—Jennifer C McNeil
*Assistant Examiner*—Vera Katz
(74) *Attorney, Agent, or Firm*—The Webb Law Firm

(57) ABSTRACT

A titanium oxide-based photocatalyst which can exhibit excellent photocatalytic properties in response to visible light while maintaining its inherent activity in response to ultraviolet light and which is suitable for mass production contains bismuth as a first additional metal component and at least one metal element selected from silicon, zirconium, aluminum, and hafnium as a second additional metal component in titanium oxide. The Bi/Ti atomic ratio is preferably at least 0.0001 and at most 1.0, the atomic ratio of the second additional metal to Ti is preferably at least 0.0001 and at most 0.8, and a portion of bismuth is preferably present in the form of lower valence ($Bi^{2+}$ or $Bi^0$). The presence of lower valence bismuth can be ascertained by XPS analysis.

29 Claims, 2 Drawing Sheets (a)

(b)

TITANIUM OXIDE PHOTOCATALYST, METHOD FOR PRODUCING SAME AND USE THEREOF

TECHNICAL FIELD

This invention relates to a titanium oxide-based photocatalyst which exhibits a photocatalytic activity not only when irradiated by ultraviolet light but also when irradiated by visible light, a method for producing the same, and a use thereof.

BACKGROUND ART

In recent years, the photocatalytic activity exhibited by titanium oxide has been applied to various environmental cleaning techniques such as deodorization, prevention of bacterial growth, and antifouling. The band gap of anatase-form titanium oxide which is generally used as a photocatalyst is approximately 3.2 eV. With this titanium oxide, photocatalytic reactions proceed when it receives ultraviolet light having a wavelength shorter than approximately 380 nm. Accordingly, in order for it to exhibit its photocatalytic activity, it is necessary for it to be irradiated by ultraviolet light. Therefore, it has limitations with respect to the environment of installation and use.

If visible light which is present in large amounts in sunlight and indoor light can be utilized as an energy source for a photocatalyst, the reaction activity of the photocatalyst can be strengthened, and it can be utilized in various places. Accordingly, development of materials which can exhibit photocatalytic activity in response to irradiation with visible light is being promoted.

Photocatalysts which have activity in response to visible light (visible light photocatalytic activity) include the following types:

(1) A nitrogen type which contains nitrogen in titanium oxide (e.g., *Chem. Phys. Lett.* 123 (1986), 126-128; *Journal of Japan Chemical Society*, 1986 (8), p. 1084; and WO 01/010552);

(2) An oxygen defect type in which oxygen defects are introduced into titanium oxide (e.g., JP 2001-205103 A1); and (3) A metal doped type which titanium oxide contains another metal (ion) therein or a metal oxide combined therewith.

As described below, many examples of a photocatalyst of the metal doped type (3) have been proposed.

For example, JP 09-262482 A1 discloses titanium oxide which contains vanadium or chromium added by ion implantation.

In *Chemical Commun.* 2001, 2718-2719, titanium oxide having activity to visible light and containing a transition metal such as V, Cr, Nb, or Mo is reported.

JP 2004-43282 A1 discloses a method for preparing a titanium oxide photocatalyst by mixing various metal compounds with titanium oxide.

JP 2004-275999 A1 discloses titanium oxide which contains a compound of a metal selected from Si, Ti, V, Sn, Sb, W, Nb, Bi, P, Mo, Cs, Ge, As, Ce and the like.

*J. Mat. Sci. Lett.* 21, 2002, 1655-1656 provides a report concerning an increase in catalytic activity of a titanium oxide-based photocatalyst and a shift toward a longer side in the wavelength of the absorption spectrum of the catalyst caused by incorporation of bismuth.

DISCLOSURE OF INVENTION

The above-described titanium oxide-based photocatalysts which are responsive to visible light do not have high activity when irradiated by visible light, whether they are of the nitrogen type, the oxygen defect type, or the metal doped type. In addition, many of these require an ion implantation apparatus or sputtering apparatus for their manufacture, so they have another problem that they are not suitable for mass production. In particular, although a metal doped type exhibits activity in response visible light, it has been found that some catalysts of this type lose their excellent activity by ultraviolet light which is characteristic of titanium oxide, whereby in environments having a sufficient amount of ultraviolet light such as the outdoors, their overall photocatalytic activities decrease.

The present invention provides a titanium oxide-based photocatalyst which can exhibit excellent visible light photocatalytic activity while maintaining its inherent activity in response to ultraviolet light (ultraviolet light activity) and a method for preparation of the catalyst which is suitable for its mass production.

The present invention was completed based on the below-described findings (1)-(3).

(1) A complex titanium oxide which contains bismuth as a first additional metal (elemental) component and at least one metal element selected from silicon, zirconium, aluminum, and hafnium as a second additional metal (elemental) component in a suitable range of amount in titanium oxide serves as a photocatalyst having markedly improved visible light activity. The above-described bismuth and second additional metal both mean metal elements, and they are present in the photocatalyst in the form of a compound of the metal. In this specification, a compound of a metal includes a metal in elemental form (metal itself).

(2) This titanium oxide-based photocatalyst has a markedly increased visible light photocatalytic activity when it exhibits a characteristic XPS pattern.

(3) The photocatalytic activity is further increased by controlling the content of nitrogen in a precursor of the catalyst by a suitable method such as washing and adjusting calcining conditions.

In one aspect, the present invention is a titanium oxide-based photocatalyst characterized by comprising titanium oxide which contains bismuth as a first additional metal component and at least one metal element selected from silicon, zirconium, aluminum, and hafnium as a second additional metal component. As stated above, the bismuth and the at least one metal element may be present in the photocatalyst in the form of a metal compound containing the elemental metal.

Preferred embodiments of a titanium oxide-based photocatalyst according to the present invention encompasses the following:

The second additional metal component is silicon.

The metallic atomic ratio $\alpha$ of bismuth (the first additional metal component) to titanium ($\alpha=Bi/Ti$) is at least 0.0001 and at most 1.0.

The metallic atomic ratio $\beta$ of the second additional metal component to titanium ($\beta$=second additional metal/Ti) is at least 0.0001 and at most 0.8.

The titanium oxide further contains at least 0.0005 weight percent and at most 1.0 weight percent of nitrogen.

A titanium oxide-based photocatalyst according to the present invention can be prepared by a method comprising the following steps (a)-(c) (wherein either of step (a) and step (b) may be first, or they may be simultaneous):

(a) bringing a titanium oxide precursor compound into contact with a bismuth compound serving as a source of a first additional metal component and at least one compound which serves as a source of a second additional metal component selected from silicon, zirconium, aluminum, and hafnium to obtain a mixture (wherein at least one of these compounds is hydrolyzable), (b) hydrolyzing the hydrolyzable compound, and (c) subjecting the mixture containing a hydrolysate obtained by steps (a) and (b) to heat treatment preferably at a temperature of 400-700° C.

In a titanium oxide-based photocatalyst according to the present invention, it is thought that the second additional metal component (silicon, zirconium, aluminum, and/or hafnium) constitutes a complex oxide together with bismuth as the first additional metal component and titanium which is the main metal component and that the complex oxide functions as one component of the catalyst serving to exhibit visible light activity. In the above-described method according to the present invention, the complex oxide is formed when the mixture obtained after hydrolysis undergoes heat treatment during step (c).

As already stated, there have been reports in the past that the activity to visible light of a titanium oxide-based photocatalyst is developed by including a metal as an additional metal component in titanium oxide. However, as far as the present inventors know, there has not been a report having a specific disclosure accompanied by experimental results of a photocatalyst responsive to visible light in which titanium oxide contains at least two metals in the form of a first additional metal component (bismuth) and a second additional metal component. As will be demonstrated by the below-described examples, when titanium oxide contains only a first additional metal component bismuth) or only a second additional metal component, a sufficient increase in visible light photocatalytic activity compared to titanium oxide not containing any additional metal component is not observed.

However, in a titanium oxide-based photocatalyst according to the present invention containing both bismuth and a second additional metal component in titanium oxide, a significant effect of increasing activity to visible light is observed compared to titanium oxide not containing any additional metal component or compared to titanium oxide containing only one of bismuth and a second additional metal component. If the contents of bismuth and the second additional metal component are within the ranges defined above by the metal atomic ratios $\alpha$ and $\beta$, the effects thereof becomes marked.

Preferably, a titanium oxide-based photocatalyst according to the present invention her contains a certain amount of nitrogen, since the response to visible light becomes even stronger. The development and strengthening of response to visible light of titanium oxide by the addition or inclusion of nitrogen is described in some of the above-described publications. In a titanium oxide-based photocatalyst containing nitrogen, it is thought that the nitrogen causes a new electronic interaction with cations in the photocatalyst, leading to the strengthening of response to visible light.

In the present invention, the effect of containing a certain amount of N is added to the synergistic effect on visible light activity of the above-described combination of bismuth and the second additional metal component. Therefore, compared to a conventional titanium oxide-based photocatalyst to which a certain amount of N is added by itself, the visible light activity of the photocatalyst is markedly increased.

In a preferred embodiment of a titanium oxide-based photocatalyst according to the present invention, the x-ray diffraction pattern of a sample of the titanium oxide-based photocatalyst itself or its precursor obtained by heat treatment at 600° C. has substantially no peak assigned to rutile crystals of titanium oxide. This means that the titanium oxide-based photocatalyst contains substantially no rutile crystals. Here, "has substantially no peak" means that the ratio of rutile crystals to anatase crystals is less than 1.0%.

Concerning the crystal structure of a titanium oxide-based photocatalyst according to the present invention, the titanium oxide at least partially comprises anatase crystals, and the crystallite size calculated from the x-ray diffraction peak of the anatase crystals is preferably at most 20 nm.

Such a titanium oxide-based photocatalyst in which the titanium oxide contains substantially no rutile crystals and is constituted by fine crystals primarily of anatase can exhibit an even higher photocatalytic function.

Preferably, a titanium oxide-based photocatalyst according to the present invention containing bismuth as a first additional metal component along with silicon or the like as a second additional metal component gives a spectrum having a characteristic pattern in analysis by XPS (x-ray photoelectron spectroscopy), since it exhibits a particularly excellent visible light photocatalytic activity. Therefore, such a photocatalyst is preferred.

Specifically, the Bi-4f inner shell level spectrum obtained by XPS analysis of a titanium oxide-based photocatalyst according to the present invention preferably has at least two groups of paired peaks among the three groups of paired peaks located in the following regions:

(a) 165-162.5 eV and 159.7-157.2 eV, (b) 163-161 eV and 157.7-155.7 eV, and (c) 162.5-160 eV and 157.2-154.7 eV.

According to *Journal of Electron Spectroscopy and Related Phenomena*, 25 (1982), 181-189, in an XPS spectrum based on the Bi-4f inner shell level of a titanium oxide-based photocatalyst, the paired peaks located in the regions (a) 165-162.5 eV and 159.7-157.2 eV are assigned to the Bi-4f 5/2 state and the Bi-4f 7/2 state, respectively, of $Bi^{3+}(Bi_2O_3)$, and the paired peaks located in the regions (c) 162.5-160 eV and 157.2-154.7 eV are assigned to the Bi-4f 5/2 state and the Bi-4f 7/2 state, respectively, of $Bi^0$ (metallic Bi). According to *Chemistry of Materials*, 8 (1996) p. 1287-1291 in addition to the above-described documents, the paired peaks located in the regions (b) 163-161 eV and 157.7-155.7 eV are assigned to the Bi-4f 5/2 state and the Bi-4f 7/2 state, respectively, of $Bi^{2+}(BiO)$. As can be seen from the above, the energy difference between the peaks in the Bi-4f 5/2 state and the Bi-4f 7/2 state of the paired peaks in each group is 5.3 ($\pm 0.1$) eV.

Accordingly, the fact that the above-described XPS specimen has at least two groups of paired peaks among the three groups of paired peaks located in above-described regions (a)-(c) means that in a titanium oxide-based photocatalyst according to the present invention, the state of bismuth contained in the titanium oxide is not only normal trivalent bismuth ($Bi^{3+}$) but is at least partially bivalent ($Bi^{2+}$) and/or zero valence ($Bi^0$), namely, in a reduced state which is of a lower valence than trivalent. It is conjectured that a superior visible light photocatalytic performance is exhibited when the content of this reduced bismuth is at least a certain amount.

Although it has not been determined conclusively, at the present time, it is thought that in a titanium oxide-based photocatalyst according to the present invention containing bismuth and a second additional metal component, the visible light activity of titanium oxide, which is the mother substance of the catalyst, is markedly increased due to the fact that (1) titanium oxide is maintained as anatase fine crystals, preventing crystal dislocation from taking place readily, (2) bismuth inhibits charge recombination, and (3) bismuth and a second additional metal component act to give a synergistic effect as additional components and accelerate formation of carriers by irradiation with visible light.

The above-described spectrum is preferably either of the following:

(1) One having the above-described three groups of paired peaks (a), (b), and (c);

(2) If the total areas of the paired peaks of each of groups (a), (b), and (c) are respectively a, b, and c, then the value of the peak area ratio (b+c)/a is at least 0.15;

(3) If the total areas of the paired peaks of each of groups (a) and (b) are respectively a and b, then the value of the peak area ratio b/a is at least 0.05; and/or (4) If the total areas of the paired peaks of each of groups (a) and (c) are a and c, then the value of the peak area ratio c/a is at least 0.1.

According to the present invention, a titanium oxide-based photocatalyst which exhibits a markedly strengthened visible light photocatalytic activity while maintaining the inherent ultraviolet light photocatalytic activity of titanium oxide can be efficiently mass produced. This photocatalyst has an extremely strong photocatalytic activity compared to a conventional titanium oxide-based photocatalyst which is responsive to visible light, and a strong effect of cleaning the environment can be expected both in the outdoors and in lightened places such as in doors or in tunnels.

BEST MODE FOR CARRYING OUT THE INVENTION

Figure 1:
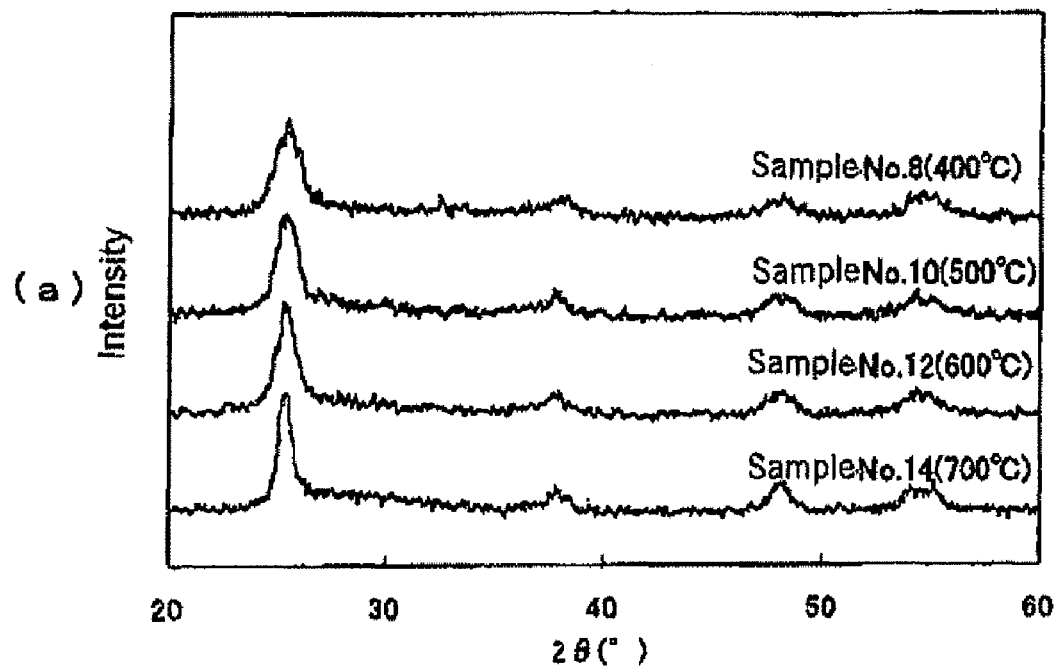
FIGS. 1(a) and 1(b) are x-ray diffraction patterns of samples obtained by varying the heat treatment temperature in Example 2.
Figure 1:
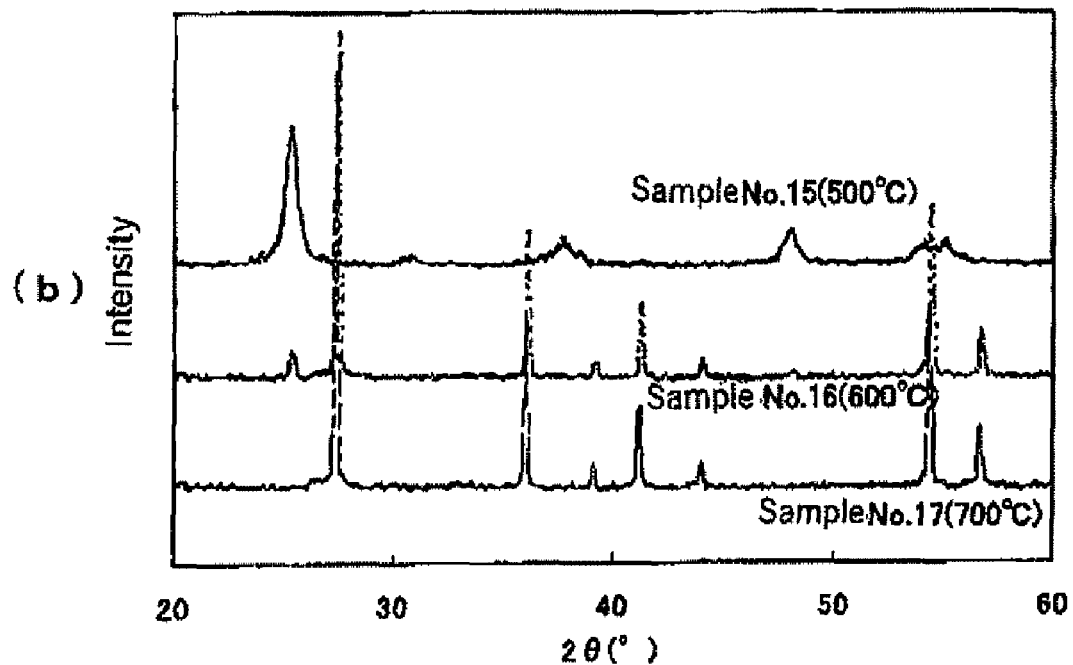

Next embodiments of the present invention will be explained in detail. In this description, unless otherwise specified, % means atomic % (at %).

A photocatalyst according to the present invention having excellent visible light activity comprises titanium oxide containing bismuth as a first additional metal component and at least one metal element selected from silicon, zirconium, aluminum, and hafnium as a second additional metal component Bismuth and the metal of the second additional metal component partially form a complex metal oxide with titanium oxide, so at least a portion thereof is present in the photocatalyst in the form of a metal oxide.

From the standpoint of photocatalytic activity, a preferred second additional metal component is silicon. By containing both bismuth and the second additional metal component in titanium oxide and forming a complex oxide, a photocatalyst is obtained which exhibits higher visible light photocatalytic activity compared to a conventional titanium oxide-based photocatalyst which is responsive to visible light. Moreover, in a photocatalyst according to the present invention; the inherent ultraviolet light photocatalytic activity of titanium oxide is maintained or even strengthened.

The contents of the first and second additional metal components in the titanium oxide are preferably as follows.

The metallic atomic ratio t of the first additional metal component (bismuth) to titanium ($\alpha$=Bi/Ti) is preferably in the range of at least 0.0001 (=0.01%) to at most 1.0 (=100%).

The metallic atomic ratio $\beta$ of the second additional metal component to titanium ($\beta$=second additional metal/Ti) is preferably in the range from at least 0.0001 (=0.01%) to at most 0.8 (=80%).

If at least one of $\alpha$ and $\beta$ is less than 0.0001 or the value of $\alpha$ exceeds 1.0 or the value of $\beta$ exceeds 0.8, the effect of increasing response to visible light by the addition of the corresponding additional metal component sometimes decreases.

A more preferred range for the value of either $\alpha$ or $\beta$ is 0.001 (=0.1%) to 0.3 (=30%). In this range, the catalyst has a higher visible light activity and its preparation is easier.

The sum $\alpha+\beta$ is preferably at most 0.6.

The titanium oxide of a titanium oxide-based photocatalyst according to the present invention may be entirely crystalline, or it may be partially crystalline, i.e., it may contain amorphous form. The crystal form of the titanium oxide may be a single phase of anatase, rutile, or brookite, or it may be a mixture of two or more of these crystals. However, in order to exhibit high activity, the titanium oxide is preferably a single phase of anatase.

Another crystallographic characteristic of a titanium oxide-based photocatalyst according to the present invention is that, as stated above, the x-ray diffraction pattern of a sample obtained by heat treatment at 600° C. of either the titanium oxide-based photocatalyst itself or a precursor thereof which has not been heat-treated to form titanium oxide preferably has substantially no peak assigned to rutile crystals of titanium oxide in order for it to exhibit superior visible light activity. In this case, the titanium oxide-based photocatalyst prior to undergoing heat treatment at 600° C. should contain no rutile form of titanium oxide.

In a titanium oxide-based photocatalyst, increasing crystallinity of titanium oxide often provides a higher degree of photocatalytic activity. In order to increase crystallinity, it is desirable to increase the heat treatment temperature to a certain extent. However, with typical titanium oxide, from around when the heat treatment temperature exceeds 500° C., transformation from highly active anatase to rutile having a lower activity takes place, and as a result, its photocatalytic activity decreases. In contrast, with a titanium oxide-based photocatalyst according to the present invention containing Bi and a second additional metal component, even when heat treatment is carried out at a temperature exceeding 600° C. and sometimes at a temperature exceeding 800° C., there are cases in which transformation frown anatase to rutile does not take place. In such cases, namely, when a transformation to rutile does not take place in a heat treatment test at 600° C. of a titanium oxide-based photocatalyst itself or a precursor thereof, the photocatalyst can exhibit a particularly high photocatalytic activity.

When the photocatalyst itself or a precursor thereof is fixed to the surface of a substrate or the like, even if the heat treatment temperature increases to at least 600° C., there are cases in which transformation to rutile is impeded due to the effect of the substrate. Accordingly, when a photocatalyst or a precursor thereof is fixed to a substrate, is it removed from the substrate before it is subjected to heat treatment at 600° C. for evaluation of x-ray diffraction pattern. The atmosphere in this heat treatment test is an oxidizing atmosphere (such as air).

A titanium oxide-based photocatalyst according to the present invention may further contain nitrogen in order to increase its response to visible light. A preferred content of nitrogen in the photocatalyst is in the range of at least 0.0005 weight % to at most 1.0 weight %, and more preferably it is at least 0.001 weight % and at most 0.1 weight %. If the content of nitrogen is less than 0.0005 weight %, response to visible light is not strengthened, while if it exceeds 1.0 weight %, visible light activity decreases and preparation of the photocatalyst becomes complicated.

One characteristic of a titanium oxide-based photocatalyst according to the present invention is a characteristic pattern in a spectrum obtained by XPS analysis. Specifically, the Bi-4f inner shell level spectrum obtained by XPS analysis of the photocatalyst has at least two groups of paired peaks of the three groups of paired peaks located in the ranges (a) 165-162.5 eV and 159.7-157.2 eV, (b) 163-161 eV and 157.7-155.7 eV, and (c) 162.5-160 eV and 157.2-154.7 eV. As stated above, this means that at least a portion of bismuth is contained in titanium oxide in a reduced state (as $Bi^{2+}$ and/or $Bi^0$).

The above-described XPS spectrum preferably contains all three of the above-described groups (a)-(c) of paired peaks. In this case, bismuth is present as $Bi^{3+}$, $Bi^{2+}$, and $Bi^0$.

If the total areas of each group of paired peaks of the three above-described groups (a)-(c) of paired peaks are a, b, and c, respectively, then the value of the peak area ratio (b+c)/a is preferably at least 0.15, and more preferably at least 0.2. As a result, a photocatalyst can be obtained which stably exhibits excellent visible light photocatalytic activity. Either one of b and c may be 0.

The value of the peak area ratio b/a is preferably at least 0.05 and more preferably at least 0.1. This means that in such a titanium oxide-based photocatalyst, at least a portion of bismuth becomes $Bi^{2+}$. As a result, the visible light photocatalytic activity is increased.

The value of the peak area ratio c/a is preferably at least 0.1 and more preferably at least 0.2. This means that in such a titanium oxide-based photocatalyst, at least a portion of bismuth becomes $Bi^0$. As a result, visible light photocatalytic activity is further increased.

In calculating the area, strength, and location of peaks in an XPS spectrum, in cases in which adjoining peaks overlap and it is difficult to read the peak strength, peak separation may be carried out if necessary using commercially available software or the like, and then the strength of each peak is calculated.

The locations of the peaks may shift according to the conditions of XPS analysis, the form of a sample, and similar factors, thereby making assignment of each peak difficult. As a guideline for such circumstances, in an XPS spectrum prescribed in the above manner, using the location of each of $Bi^{3+}(Bi_2O_3)$ of a Bi-4f 5/2 state and a Bi-4f 7/2 state in the ranges (a) 165-162.5 eV and 159.7-157.2 eV, respectively, as a reference, a peak which is located on the lower energy side thereof by just 1-2 eV is assigned to $Bi^{2+}$(BiO), and a peak located on the lower energy side by greater than 2 eV is assigned to $Bi^0$ (metallic Bi).

When a sample of a photocatalyst undergoes XPS analysis, its surface may be oxidized such that a lower valence bismuth is transformed into $Bi^{3+}$. As a result, if the XPS analysis is performed on the sample as it is, of the three above-described groups of paired peaks (a)-(c) in the Bi-4f inner shell level spectrum of the XPS spectrum exhibited by a titanium oxide-based photocatalyst according to the present invention, the peak strength of the group of paired peaks assigned to a lower valence bismuth i.e., (b) 163-161 eV and 157.7-155.7 eV and (c) 162.5-160 eV and 157.2-154.7 eV sometimes becomes lower than in actuality, or a peak may not be observed at all. In this case, XPS analysis is preferably carried out after removing at least several nm of the surface of the sample by etching or sputtering with argon or the like.

A titanium oxide-based photocatalyst according to the present invention can be supported on a supporting substance which is photocatalytically inactive. to Examples of a support are silica, alumina, and zeolite. It is also possible to contain a precious metal such as platinum, ruthenium, or palladium in the photocatalyst as a promoter.

The shape of the photocatalyst includes particles, fibers, and thin films, and it is preferably chosen in accordance with the use. In the case of particles, particles range from fine powder with a diameter on the order of several nm to granules on the order of tens of μm, and their size and form are not restricted. A thin film is normally fixed on a substrate.

When a photocatalyst is formed into a shape such as a thin film or a fiber, it may be desirable that a binder be added to particles of the photocatalyst. Addition of a binder makes it possible to increase the thickness of a film or the diameter of fibers and to increase the strength or workability of a film or fibers.

A titanium oxide-based photocatalyst according to the present invention may be prepared by either of a dry method such as sputtering or CVD or a wet method such as the sol gel method or hydrolysis.

A preferred preparation method includes the following steps (a)-(c):

(a) a step of bringing a titanium oxide precursor compound into contact with a bismuth compound serving as a source of a first additional metal component and at least one compound serving as a source of a second additional metal component selected from silicon, zirconium, aluminum, and hafnium to obtain a mixture in which at least one of these compounds is hydrolyzable, (b) a step of hydrolyzing the hydrolyzable compound, and (c) a step of subjecting a mixture containing a hydrolysate of the hydrolyzable compound obtained via steps (a) and (b) to heat treatment.

Either of steps (a) and (b) may be performed first, or they may be performed simultaneously. Step (b) and (c) can be carried out by a single heat treatment process. However, from the standpoint of the activity of the photocatalyst and ease of preparation, it is preferable to carried out these steps in the order of step (a), stop (b), and step (c). It is possible to repeat one of the steps two or more times, repeat steps (a)-(c) in order two or more times, or repeat step (a) and step (b) two or more times and then finally perform step (c).

Any titanium oxide precursor compound which forms titanium oxide by hydrolysis and/or heating can be used as a source of titanium oxide which is the main component of a photocatalyst according to the present invention. Examples of such a compound are inorganic titanium compounds such as titanium tetrachloride, titanium trichloride, titanium sulfate, titanium hydroxide, and titanium fluoride; as well as organic titanium compounds exemplified by alkoxides such as titanium tetraethoxide and titanium tetraisopropoxide.

Examples of a bismuth compound which is a source of the first additional metal component include inorganic bismuth compounds such as bismuth chlorides bismuth nitrate, bismuth sulfate, bismuth oxide, titanium bismuth oxide, bismuth oxychloride, bismuth phosphate, bismuth fluoride, and bismuth carbonate; as well as organic bismuth compounds such as bismuth naphthenate, bismuth acetate, and bismuth alkoxides. Bismuth compounds are normally trivalent bismuth compounds, but a lower valence bismuth compound in which all or a portion of the bismuth is bivalent or of lower valence may be used.

In principle, the metal compound which is a source of the second additional metal component (silicon, zirconium, aluminum, and/or hafnium) can be any compound containing the metal element. As stated above, "compound" includes the elemental metal itself.

Examples of silicon compounds include inorganic silicon compounds such as so silica, silica colloid, silicon tetrachloride, silicon iodide, silicon nitride, silicon nitrate, and silicon sulfide; and organic silicon compounds such as alkoxysilanes such as tetraethoxysilane and methylethoxysilane, silicon acetate, and silicone resins.

Examples of zirconium compounds include inorganic zirconium compounds such as zirconium oxide, zirconium oxide colloid, zirconium chloride, zirconium chlorate, zirconium nitrate, zirconium nitrate oxide, and zirconium sulfate; and organic zirconium compounds such as zirconium isopropoxide, acetylacetonato zirconium, zirconium butoxide, and zirconium ethoxide.

Examples of aluminum compounds include inorganic aluminum compounds such as aluminum, aluminum chloride, aluminum fluoride, aluminum hydroxide, aluminum nitrate, and aluminum sulfate; and organic aluminum compounds such as aluminum ethoxide and aluminum isopropoxide.

Examples of compounds containing hafnium include hafnium ethoxide, hafnium chloride, and hafnium sulfate.

Among these compounds, metal chlorides such as titanium tetrachloride, bismuth chloride, silicon tetrachloride, zirconium chloride, aluminum chloride, and hafnium chloride are preferable sources of the respective metals, since they are easily and inexpensively available in the form of a high purity product and if these are used, a titanium oxide-based photocatalyst having excellent photocatalytic activity can be obtained.

Of the raw material compounds used in the preparation of a titanium oxide-based photocatalyst according to the present invention, i.e., (1) a titanium oxide precursor compound, (2) a bismuth compound, and (3) a metal compound which is a source of the second additional metal component, some of the compounds may be a solid. In this case, the solid can act as a support. For example, when using a solid substance such as silica or silicon nitride as a silicon compound, it serves as a support, and the titanium oxide which is finally formed on the support contains silicon by contact with the support.

A titanium oxide precursor compound is brought into contact with a bismuth compound and a metal compound which is a source of the second additional metal component. There is no particular limitation on the form of this contact, but preferably at least some of the raw material compounds are soluble solid substances or volatile substances so that they can be used in the form of a solution or gas to contact with the other raw material compounds.

In addition to the above-described raw material compounds, it is possible to use a small amount of compounds of other elements (such as an iron compound or a cobalt compound) in the contacting step (a) with the object of doping.

At least one of the above-described raw material compounds is a hydrolyzable compound such as a chloride or an alkoxide. Before or after the contacting step, or at the same time as the contacting step, the hydrolyzable compound is hydrolyzed. This hydrolyzing step (b) can be carried out with pure water, an aqueous acid solution, or an aqueous basic solution.

When the hydrolyzable compound is a salt with an acid as is the case with a chloride, hydrolysis is preferably carried out while neutralizing with a base. Examples of a useful base include sodium hydroxide, sodium hydrogen carbonate, ammonia, and amines. In particular, a nitrogen containing base including inorganic bases such as ammonia, ammonium salts, and hydrazine, and organic amines such as triethanolamine, diethanolamine, pyridine, and pyrrolidone is preferred as a base for use in the present invention because at least a portion thereof remains in the hydrolysate, thereby imparting nitrogen to the photocatalyst which is formed after heat treatment, and at the same time, functioning as a reducing agent to partially reduce Bi during heat treatment as described below.

For example, when all of the above-described raw material compounds (1)-(3) are a hydrolyzable metal chloride, step (a) can be carried out by mixing aqueous solutions of the metal chlorides (such as by dripping), and the hydrolyzing step (b) can be carried out by neutralizing the resulting mixed aqueous solution of the chlorides with a base. As a result, a precipitate comprising the hydrolysates of the chlorides which are a hydroxide of each metal is formed. The precipitate is separated, washed with water or alcohol or the like if necessary, and dried before it is subjected to the heat treatment step (c).

Heat treatment of a mixture containing a hydrolysate of a hydrolyzable raw material compound which is obtained by steps (a) and (b) (such as the above-described precipitate) produces a titanium oxide-based photocatalyst according to the present invention which is normally in the form of a powder. This photocatalyst contains bismuth as the first additional metal component and the second additional metal component both in the form of a complex oxide with titanium oxide.

The heat treatment temperature in the heat treatment step (c) is preferably in the range of 300-800° C. If the heat treatment temperature is outside of this range, the resulting titanium oxide complex oxide may not exhibit sufficient visible light activity. A more preferred range for the heat treatment temperature is at least 400° C. to at most 700° C. In this temperature range, complexation of three types of oxides of Ti, Bi, and the second additional metal component takes place in an orderly manner, and a titanium oxide-based photocatalyst which has sufficient crystallinity and a high specific surface area as well as excellent visible light activity is obtained. The length of time for which the temperature is maintained during heat treatment is not limited, but from 10 minutes to 6 hours are suitable. There is no particular limit on the rate of temperature increase, but from the standpoints of photocatalytic activity and productivity, at least 5° C. per minute is preferable.

The atmosphere for heat treatment can be any of an oxidizing atmosphere such as air, pure air, or oxygen; an inert atmosphere such as nitrogen or argon, or a reducing atmosphere containing a reducing gas such as hydrogen or ammonia. It may also be an atmosphere which is a combination of these.

When the mixture which undergoes heat treatment already contains a bismuth compound of a lower valence or contains a substance which can reduce bismuth, a titanium oxide-based photocatalyst according to the present invention can be prepared even if heat treatment is carried out in an oxidizing atmosphere such as air. In this case as well, if the heat treatment atmosphere is a reducing atmosphere, there is the possibility of further improving visible light photocatalytic activity.

Examples of compounds which can reduce bismuth are nitrogen-containing compounds such as ammonia, ammonium ions, hydrazine, and amines, and hydrides such as $NaBH_4$. Such a compound can be introduced into the mixture which undergoes heat treatment at any stage. For example, it may be introduced by being added to the mixture prior to heat treatment. When using a basic nitrogen-containing compound having a reducing effect, it is convenient to introduce it into the mixture by using it for neutralizing in the hydrolyzing step (b).

When the mixture which undergoes heat treatment contains a nitrogen-containing compound which can reduce bismuth, a titanium oxide-based photocatalyst according to the present invention which is obtained after heat treatment generally contains nitrogen. As stated above, if a titanium oxide-based photocatalyst contains at least 0.0005 weight % and at most 1.0 weight % of nitrogen, its response to visible light is strengthened. In addition to the above-described method using a nitrogen-containing compound in the hydrolysis step (b), nitrogen can be introduced into titanium oxide by adding a source of nitrogen to the mixture which undergoes heat treatment (for example, by contacting the mixture with a solution containing a nitrogen compound, or by absorbing nitrogen gas or ammonia gas into the mixture).

In order to form titanium oxide having a nitrogen content in the above-described range after heat treatment the nitrogen content of the mixture before heat treatment is preferably at least 0.1 weight % on a dry basis. The nitrogen content is more preferably at least 1 weight %, and it is still more preferably at least 3 weight %. The nitrogen content of the mixture can be adjusted by the extent of washing and/or filtering of the mixture before heat treatment.

When the mixture which undergoes heat treatment does not contain a compound which can reduce bismuth, a non-oxidizing atmosphere (such as an inert atmosphere or a reducing atmosphere) is preferable as the heat treatment atmosphere. A particularly preferred heat treatment atmosphere is a reducing atmosphere containing hydrogen and/or a nitrogen compound having a strong reducing effect such as ammonia, hydrazine, or an amine.

The titanium oxide-based photocatalyst obtained by heat treatment preferably has a portion of Bi reduced to a lower valence than $Bi^{3+}$ (i.e., to $Bi^{2+}$ and/or $Bi^0$). This is because, as stated above, if titanium oxide contains such bismuth of a lower valence, visible light activity of a titanium oxide-based photocatalyst becomes particularly high.

A titanium oxide-based photocatalyst according to the present invention which is prepared by the above-described method can be used as is in the form of a powder. However, from the standpoint of ease of use, it is convenient to use it in the form of a photocatalytic functional member in which it is adhered for fixation to a substrate surface.

The manner of fixing the photocatalyst can be selected in accordance with the shape of the surface of the substrate and the use. For example, the photocatalyst can be in the form of a thin film, particles, or fabric. The type of substrate is not limited, and examples are metals such as carbon steel, plated steel, chromate treated steel, enamel ware, stainless steel, titanium, and aluminum; inorganic materials such as ceramics, glass, pottery, and quartz; and organic materials such as plastics, resins, and activated charcoal. The substrate may also be a combination of these materials, such as a painted or precoated steel sheet.

A preferred substrate is metal or a member having its surface covered with a material which is not decomposed by the photocatalyst. A substrate having its entirety or its surface made from an organic material may deteriorate or decompose as a result of the oxidizing action of the photocatalyst. In this case, the surface of the substrate is previously covered with a material which is not decomposed by the photocatalyst. Among organic materials, silicone resins, for example, are not readily deteriorated by photocatalysts, so depending upon the conditions, they need not be coated.

There is no particular limitation on the shape of the substrate, and it may be any shape such as a thin sheet, a thick plate, a fabric (including woven and non-woven fabrics), a mesh, or a cylinder. It may be an object of complicated shape which is used as a product as manufactured, or it may be an object which is previously installed or already in use. The surface of the substrate may be porous or dense.

A photocatalytic functional member can be prepared by applying a dispersion or a coating composition comprising particles of a titanium oxide-based photocatalyst according to the present invention dispersed in a solvent to a substrate and drying the resulting film. The material which is fixed to the substrate may be a precursor of a titanium oxide-based photocatalyst according to the present invention. For example, a photocatalytic functional member can be prepared by performing above-described steps (a)-(c) on the surface of a substrate. For example, a photocatalytic functional member according to the present invention can be prepared by first depositing titanium chloride, which is a precursor of titanium oxide, on the surface of a substrate, hydrolyzing the deposited titanium chloride, contacting the resulting film with a bismuth compound and a compound which is a source of the second additional metal component, and carrying out heat treatment, after hydrolysis, if necessary.

The coating composition may consist essentially only of a photocatalyst (or its precursor) and a dispersion medium (a liquid medium), but preferably it Per contains a binder.

It is possible to prepare a coating composition by simply adequately mixing a titanium oxide-based photocatalyst according to the present invention with a medium and a binder. However, a titanium oxide-based photocatalyst which is prepared by the above-described method is typically in the form fine particles having an average primary particle diameter ranging from several nm to 100 nm. Therefore, it tends to agglomerate extremely easily, and if it forms agglomerates, their diameters are typically as large as several tens of μm, which makes it becomes difficult to uniformly disperse the photocatalyst in a medium.

Therefore, in a preferred embodiment of the present invention, particles of a titanium oxide-based photocatalyst as prepared are previously adequately dispersed in a medium to prepare a dispersion of photocatalyst particles. Using this dispersion, a coating composition is preferably prepared by adding a binder to the dispersion. By using this coating composition, it is possible to form a thinner, more uniform photocatalyst film and film properties and photocatalytic activity are improved.

The average particle diameter of the photocatalyst in the dispersion (particle diameter of agglomerates) is preferably at most 500 nm. If it is larger than this particle diameter, the film tends to easily powderize, and its storage stability decreases. The average particle diameter of the photocatalyst in a dispersion is more preferably at most 300 nm and still, more preferably at most 200 nm.

Examples of a liquid medium for dispersing photocatalyst particles includes water such as distilled water, deionized water, and ultrapure water; alcohols such as methanol, ethanol, and 2-propanol; ketones such as methyl ethyl ketone; aromatic hydrocarbons such as benzene, toluene; and xylene; and the like. These may be mixed in any manner, but in this case, a combination of compatible solvents is used.

Dispersion treatment is preferably carried out by mixing the photocatalyst with a medium so as to give a solids content in the range from several weight % to 50 weight %. If the solids content of the resulting dispersion is outside of this range, dispersibility of the particles sometimes decreases. If necessary, a dispersing agent or a deflocculant may be added. Examples of a dispersing agent are of carbonyl or sulfone type, and examples of a deflocculant are nitric acid, hydrochloric acid, and sulfuric acid. A base or an acid may be added for pH adjustment.

Dispersion treatment may be carried out using a paint shaker which is customarily used for preparing coating compositions, but it is preferably carried out using a stronger dispersing means such as a media mill, rotating blades for shearing, a thin film spin mixer, or ultrasonic waves. It is possible to use a combination of two or more dispersing means.

When the resulting dispersion contains agglomerated coarse particles, these particles are preferably removed by filtration or centrifugal separation. This is because coarse particles in a film easily become a staring point for peeling or powderization. It is also possible to add a solvent to the dispersion after dispersion treatment to adjust its solids content.

This dispersion can be used as is for application to a substrate. If the photocatalyst in the dispersion is fine particles with an average particle diameter of at most 500 nm, it can be formed into a film without a binder, and a film consisting essentially of photocatalyst particles can be formed. However, in this case, since the film has a low strength and adhesion, a binder solution may be applied atop the film which is formed to impregnate the binder between the photocatalyst particles.

A preferred coating composition flier contains a binder in addition to a photocatalyst and a dispersing medium. The medium may be the same as that described above with respect to a dispersion, and it is selected so that the binder is dissolved or emulsified therein. If a coating composition is prepared by mixing a binder into the above-described dispersion containing a titanium oxide-based photocatalyst it is possible to form a coating composition which has excellent dispersion of photocatalyst particles, good storage stability, and the ability to form a film having a high photocatalytic activity.

The amount of the binder is adjusted so that the content of a titanium oxide-based photocatalyst in the film which is formed is 5-95 weight %. A film having a content of photocatalyst of less than 5 weight % exhibits almost no photocatalytic activity when irradiated by visible light. If the content of photocatalyst in a film exceeds 95 weight %, the amount of the binder is too small and the film easily peels off. The content of photocatalyst in the binder is preferably 30-90 weight %, and it is more preferably at least 50 weight % in order to obtain sufficient photocatalytic activity.

A binder which can be used includes metal oxides in sol form (which become a gel in a film) such as silica, alumina, titania, magnesia, zirconia, and the like; organic silane compounds; and organic resins such as silicone resins, fluororesins, urethane resins, and acrylic resins. Under conditions in which decomposition of the binder component occurs due to the oxidizing force of the photocatalyst, a binder which does not readily decompose such as a metal oxide sol or a silicone, acrylic-silicone, acrylic-urethane resin is preferably used. When good workability and high strength are demanded of a photocatalytic functional member, the required properties can be obtained by adding an appropriate amount of an organic resin such as a fluororesin, an acrylic resin, or a urethane resin to the above-described binder component which does not readily decompose.

A preferred binder is a silicon compound such as silica (such as silica sot), a hydrolysate/condensate of an organic silane compound, or a silicone resin. Silica may be a silica sol (colloidal silica) formed by hydrolysis and condensation of a silicate ester (such as ethyl silicate). As an organic silane compound, an organic hydrolyzable organic silane compound having a film-forming ability such as an alkoxysilane or a silane coupling agent can be used. The binder component may be used in a form in which it is homogeneously dissolved in a medium, or it may be emulsified in a medium for use as an emulsion.

The coating composition may contain components in addition to those described above. Examples of such other components are a titanium oxide-based photocatalyst which is not responsive to visible light (such as a conventional titanium oxide-based photocatalyst) and a support when the photocatalyst comprises supported particles. In addition, a small amount of a coloring agent (preferably an inorganic pigment) or an extender pigment may be contained in a film.

Methods of applying the coating composition can be selected from various known methods in view of the form of the coating composition and the shape of the substrate. After application, if necessary, the film is dried while heating (and cured depending on the binder). The drying (curing) temperature can be determined based on the composition of the coating composition (the type of solvent and binder), the heat resistance temperature of the substrate, and the like. When the coating composition contains a precursor of a titanium oxide photocatalyst, heating is carried out so that the precursor changes into titanium oxide.

The thickness of the photocatalyst-containing film which is formed on the substrate is preferably at least 0.1 µm. If the film is thinner than 0.1 µm, the amount of photocatalyst becomes too small, and the photocatalytic activity induced by irradiation with visible light becomes extremely low. The film thickness is suitably selected based on the necessary catalyst properties and cost, but from the standpoint of stability of catalyst performance and catalytic activity, it is more preferably at least 1 µm and still more preferably at least 5 µm. There is no particular upper limit on the thickness, but taking cost and saturation of effects into consideration, it is at most 50 µm and preferably at most 20 µm.

A titanium oxide-based photocatalyst according to the present invention and a photocatalytic functional member having the photocatalyst on a surface exhibit photocatalytic activity when made to contact a substance to be treated under irradiation not only by ultraviolet light but also by visible light with a wavelength of at least 400 nm, and they can decompose, remove, or render harmless various harmful substances and adhered substances. The photocatalyst can be used in an environment in which it is capable of contacting a substance which is to be decomposed and in which it can be irradiated with visible light. The light source can be any one which includes a portion of the wavelength of visible light rays. For example, sunlight, a fluorescent lamp, a halogen lamp, a black light, a xenon lamp, a mercury vapor lamp, and the like can be used. A photocatalyst according to the present invention also exhibits its activity by irradiation with ultraviolet light, so the light source may contain visible light and ultraviolet light. Such a light source increases photocatalytic activity.

Examples of harmful substances or adhered substances which can be disposed of by a titanium oxide-based photocatalyst according to the present invention are VOC gases such formaldehyde, acetaldehyde, and toluene; atmospheric pollutant gases such as $NO_x$, $SO_x$, and Freon; smelly gases such as ammonia, hydrogen sulfide, and mercaptans, organic compounds such as alcohols, BTX, and phenols; organic halides such as trihalomethane, trichloroethylene, and Freon; various agricultural chemicals such as herbicides, bactericides, and pesticides; biological oxygen demand substances such as proteins and amino acids; surface active agents; inorganic compounds such as cyanides and sulfur compounds; various heavy metal ions; microorganisms including bacteria such as *Escherichia coli, staphylococci* and *Pseudomonas*

*aeruginosa*, molds, and algae; oils, tobacco resin, fingerprints, rain streaks, mud, and the like.

The present invention will be illustrated by the following examples. These examples are not intended to limit the invention. In the examples, the ratios Bi/Ti and Si/Ti indicate the ratios of metal atoms.

EXAMPLE 1

Synthesis of a Titanium Oxide-based Photocatalyst

Sample No. 1:

An acidic aqueous solution containing 13.4 g of bismuth chloride ($BiCl_3$) was slowly added dropwise to 216 g of a titanium tetrachloride ($TiCl_4$) solution (Ti content 9.3 weight %), and after adequately stirring the resulting mixture, 9.7 g of liquid silicon tetrachloride ($SiCl_4$) was added dropwise to the mixture.

While the resulting mixed aqueous solution of chlorides was stirred with ice cooling, a sufficient amount of an ammonia water (concentration of 7 weight %) for neutralization was added dropwise to the solution to hydrolyze the chlorides present therein, thereby causing the corresponding hydroxides to precipitate. The resulting precipitates which contained metal hydroxides and ammonium chloride were collected by filtration, washed with distilled water, and dried in vacuum for 6 hours at 80° C. to give a hydrolysate mixture (a photocatalyst precursor). The nitrogen content of the mixture prior to heat treatment was 10.9 weight % based on the weight after vacuum drying for 6 hours at 80° C. This mixture was subjected to heat treatment for 2 hours at 500° C. in air to give a titanium oxide-based photocatalyst according to the present invention (Bi/Ti=0.101, Si/Ti=0.136). Heating to the heat treatment temperature and cooling after heat treatment were both at a rate of 10° C. per minute. The crystal form of the titanium oxide in the resulting photocatalyst was substantially 100% anatase. The nitrogen content of the photocatalyst was 0.004 weight %.

Sample No. 2:

A comparative titanium oxide-based photocatalyst (Bi/Ti=0, Si/Ti=0.136) was prepared in the same manner as for Sample No. 1 except that dropwise addition of an acidic aqueous solution of bismuth chloride was not carried out.

Sample No. 3:

Another comparative titanium oxide-based photocatalyst (Bi/Ti=0, Si/Ti=0, i.e., the catalyst was titanium oxide) was prepared in the same manner as for Sample No. 1 except that dropwise addition was not carried out with either a bismuth chloride aqueous solution or a silicon tetrachloride aqueous solution.

Sample No. 4:

An ammonia water (7 weight %) was added dropwise to an acidic aqueous solution containing bismuth chloride to hydrolyze the bismuth chloride. The resulting precipitates were filtered out, washed with distilled water, and then vacuum dried for 6 hours at 80° C. to give a hydrolysate of bismuth chloride. The hydrolysate was calcined for 2 hours at 500° C. in air to give bismuth chloride (Bi=1.00).

Sample No. 5:

Silicon tetrachloride (49 g) was slowly added dropwise to an acidic aqueous solution containing bismuth chloride (67 g). To the mixed solution of chlorides was added dropwise an ammonia water (7 weight %) to hydrolyze the chlorides. The resulting precipitates were filtered out, washed with distilled water, and vacuum dried for 6 hours at 80° C. to give a hydrolysate mixture. This mixture was calcined for 2 hours at 500° C. in air to give a silicon-containing bismuth oxide (Bi/Si=0.101/0.136).

Sample No. 6:

A comparative titanium oxide-based photocatalyst (Bi/Ti=0.101, Si/Ti=0) was prepared in the same manner as for Sample No. 1 except that dropwise addition of an aqueous silicon tetrachloride solution was not carried out.

These photocatalysts were subjected to an acetaldehyde decomposition test in the following manner to evaluate their photocatalytic activity.

[Measurement of Photocatalytic Activity (Acetaldehyde Decomposition Test)]

A sample (0.3 g) was placed on a 40 mm square dish, and the dish was inserted into a quartz reaction cell. The reaction cell was connected to a closed circulation line (total inner volume of approximately 3.7 L), and acetaldehyde diluted with nitrogen gas containing approximately 20 volume % of oxygen (approximately 240 ppm of acetaldehyde) was introduced into the system. While the gas was circulating, irradiation was carried out with visible light from a 250 watt high pressure mercury vapor lamp through a UV filter (Toshiba L42). The reaction was monitored by measuring the concentration of carbon dioxide ($CO_2$) which was formed by decomposition of acetaldehyde periodically using an automatic gas chromatograph connected to the circulation line. Photocatalytic activity was evaluated from the rate of formation of carbon dioxide. The results are shown in Table 1.

TABLE 1

| Sample | Photocatalyst composition (ratios of metal content) | | | Photocatalytic activity Rate of $CO_2$ formation |
|---|---|---|---|---|
| No.* | Bi | Si | Ti | (μmol/hr) |
| 1 | 0.101 | 0.136 | 1 | 10.7 |
| 2 | 0 | 0.136 | 1 | 1.8 |
| 3 | 0 | 0 | 1 | 2.4 |
| 4 | 1 | 0 | 0 | 0.1 |
| 5 | 0.101 | 0.136 | 0 | 0.2 |
| 6 | 0.101 | 0 | 1 | 4 |

*Sample No. 1 is an example of the present invention, and Samples Nos. 2-6 are comparative examples.

From Table 1, it can be seen that the titanium oxide-based photocatalyst of Sample No. 1 according to the present invention containing bismuth as a first additional metal component and silicon as a second additional metal component had markedly higher decomposition activity of acetaldehyde compared to the titanium oxide-based photocatalyst of Sample No. 6 or Sample No. 2 which contained only one of bismuth and silicon or the titanium oxide-based photocatalyst of Sample No. 3 which did not contain either of these (i.e., it was titanium oxide).

Almost no photocatalytic activity was observed with the bismuth oxide (Sample No. 4) and the silicon-containing bismuth oxide (Sample No. 5) prepared by the same method. With Sample No. 6 which contained only bismuth in titanium oxide, somewhat of an increase in activity was observed compared to Sample No. 3 which contained only titanium oxide, but with Sample No. 2 which contained only silicon in titanium oxide, the photocatalytic activity was lower than for Sample No. 3 which contained only titanium oxide, and the result was that addition of only silicon ended up impeding, photocatalytic activity. Accordingly, it can be seen that the photocatalyst according to the present invention of Sample No. 1 which contained both bismuth and silicon in titanium oxide provided the totally unexpected result that it exhibited markedly high photocatalytic activity under irradiation by visible light.

EXAMPLE 2

The procedure for Sample No. 1 (Bi/Ti=0.101, Si/Ti 0.136: an example of the present invention) and Sample No. 3 (Bi/Ti=0, Si/Ti=0: comparative example) of Example 1 was repeated, but the heat treatment temperature was varied in the range of 350-700° C. for Sample No. 1 and in the range of 500-700° C. for Sample No. 3. The heat treatment temperature and the visible tight photocatalytic activity of the resulting titanium oxide-based photocatalysts are shown in Table 2, X-ray diffraction graphs of some of the titanium oxide-based photocatalyst are shown in FIGS. 1(a) and 1(b).

TABLE 2

| Sample No.* | Photocatalyst | Heat treatment conditions (° C.)** | Photocatalytic activity Rate of $CO_2$ formation (μmol/hr) | Crystallite size (nm) |
|---|---|---|---|---|
| 7 | Bi/Ti = 0.101 | 350 | 6.0 | |
| 8 | Si/Ti = 0.136 | 400 | 9.3 | 5.9 |
| 9 | | 450 | 6.5 | |
| 10 | | 500 | 10.7 | 7.8 |
| 11 | | 550 | 10.6 | |
| 12 | | 600 | 10.5 | 8.4 |
| 13 | | 650 | 8.8 | |
| 14 | | 700 | 6.4 | 9.6 |
| 15 | Bi/Ti = 0 | 500 | 2.4 | 11.6 |
| 16 | Si/Ti = 0 | 600 | 1.1 | 21.5 |
| 17 | | 700 | 0.6 | — |

*Samples Nos. 7-14 are examples of the present invention, and Samples Nos. 15-17 are comparative examples.
**Heat treatment comprised heating at 10° C./minute, holding for 2 hours at the prescribed temperature, and gradually cooling at 10° C./minute.

As can be seen from Table 2, a titanium oxide-based photocatalyst according to the present invention already exhibits high photocatalytic activity by heat treatment at a temperature of 350° C., and when the heat treatment temperature becomes 500-650° C., it exhibits an even higher activity. The photocatalytic activity was particularly high when the heat treatment temperature was in the range of 500-600° C. In contrast, with the titanium oxide of the comparative examples, as the heat treatment temperature increased from 600° C. to 700° C., the photocatalytic activity sharply decreased.

As can be seen from the results of x-ray diffraction shown in FIG. 1(a), with the titanium oxide-based photocatalyst according to the present invention of Samples Nos. 8) 10, 12, and 14 of Table 2, under any of the heat treatment conditions, a diffraction peak assigned to anatase crystals of titanium oxide was observed in the vicinity of 2θ=25°. In the case of a titanium oxide-based photocatalyst according to the present invention, when the heat treatment temperature was in a range of up to at least 700° C., the crystallite size of anatase determined by the Scherrer equation was 10 nm or smaller.

On the other hand, as can be seen from the results of x-ray diffraction shown in FIG. 1(b), with the comparative examples of titanium oxide of Samples Nos. 15-17 of Table 2, when the heat treatment temperature was 500° C., single phase anatase crystals were formed, while at 600° C., rutile crystals became predominant and at 700° C., 100% rutile crystals were formed. It is thought that this is the reason for the above-described sharp decrease in photocatalytic activity.

EXAMPLE 3

A titanium oxide-based photocatalyst according to the present invention (Bi/Ti=0.101, Si/Ti=0.136) was prepared in the same manner as for Sample No. 1 of Example 1, but the nitrogen content of the hydrolysate mixture obtained by hydrolysis and subsequent washing and drying was decreased. The nitrogen content of the hydrolysate mixture before heat treatment and that of the photocatalyst after heat treatment are shown in Table 3 together with the photocatalytic activity.

For Sample No. 18 of Table 3 (nitrogen content=0%), the nitrogen content was made 0% by carrying out hydrolysis of the aqueous mixed chloride solution with an aqueous NaOH solution. On the other hand, for Samples Nos. 19 and 20 of Table 3, the nitrogen content of the hydrolysate mixture was made lower than for Sample No. 1 of Example 1 by thoroughly washing the precipitates obtained after hydrolysis with water.

TABLE 3

| Sample No.* | Nitrogen content (wt %) | | Photocatalytic activity |
|---|---|---|---|
| | Mixture before heat treatment | Catalyst | Rate of $CO_2$ formation (μmol/hr) |
| 18 | 0 | 0 | 1.3 |
| 19 | 4.2 | 0.002 | 5.4 |
| 20 | 6.3 | 0.004 | 8.5 |

From the results of Sample No. 1 of Table 1 (nitrogen content of 10.9 weight 10%) and Samples Nos. 18-20 of Table 3, it can be seen that the higher the nitrogen content (amount of ammonium chloride) in the mixture prior to heat treatment, the higher the visible light activity of the titanium oxide-based photocatalyst. This is thought to be because with a titanium oxide-based photocatalyst according to the present invention, lower valence oxides (reduced forms) of bismuth and other metals contribute to an increase in photocatalytic activity, and the higher the amount of ammonium ions in the hydrolysate mixture, the more effectively are metal ions and particularly Bi reduced to a low valence state simultaneous with introduction of nitrogen into the catalyst.

EXAMPLE 4

XPS analysis was carried out under the following conditions on a titanium oxide-based photocatalyst according to the present invention.

Apparatus: Scanning x-ray photoelectron spectroscope (PHI Quantum 2000 made by Ulvac Phi, Inc.)

X-ray source: mono-AlK α rays, 44.8 W, 17 kV

Take-off angle: 45 degrees

Diameter of x-ray beam: approximately 200 μm

Neutralizing gun: 1.0 V, 20 mA (using Ar+low speed ionization gun)

Figure 2:
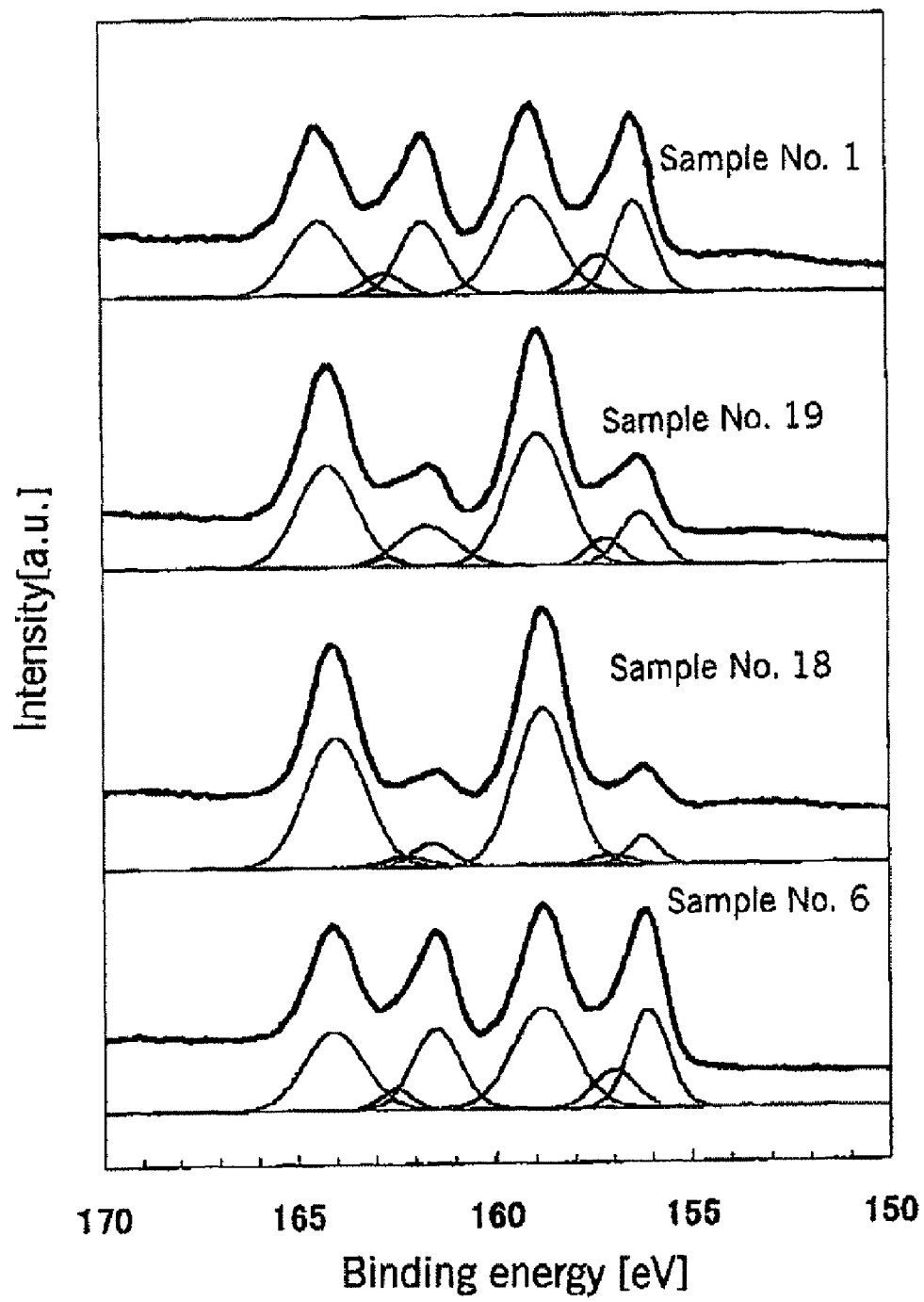
FIG. 2 shows the spectrum of the Bi-4f inner shell level in XPS analysis of each sample in Example 4.

Energy resolution: used under conditions with a half value width of approximately 0.75 eV for the Ag, 3d 5/2 peak (368.1 eV) of pure Ag Vacuum: approximately $2.0 \times 10^{-8}$ torr Four samples were used, i.e., Sample No. 1 of Example 1, Samples Nos. 18 and 19 of Example 3, and Sample No. 6 of Example 1, which was used for comparison. The Bi-4f inner shell level spectrum of each sample obtained by XPS analysis is shown in FIG. 2.

Table 4 shows the location and area of each peak of the three groups of paired peaks located in the regions (a) 165-152.5 eV and 159.7-157.2 eV, (b) 163-161 eV and 157.7-155.7 eV, and (c) 162.5-160 eV and 157.2-154.7 eV in each XPS spectrum, and it shows the values of the peak area ratios c/a, b/a, and (b+c)/a when the total areas of each of the paired peas are a, b, and c.

TABLE 4

| | Symbol for paired peak | Sample No. 1 Peak position (eV) | Peak area | Sample No. 19 Peak position (eV) | Peak area | Sample No. 18 Peak position (eV) | Peak area | Sample No. 6 Peak position (eV) | Peak area |
|---|---|---|---|---|---|---|---|---|---|
| Peak area | (a) | 164.23 | 3319 | 164.07 | 4695 | 163.95 | 3206 | 163.99 | 3693 |
| | | 158.92 | 3815 | 158.75 | 5397 | 158.64 | 4275 | 158.68 | 4246 |
| | (b) | 162.46 | 783 | 162.3 | 691 | 162.18 | 149 | 162.22 | 883 |
| | | 157.15 | 907 | 156.99 | 801 | 156.87 | 173 | 156.91 | 1023 |
| | (c) | 161.55 | 2206 | 161.38 | 1188 | 161.32 | 466 | 161.3 | 2510 |
| | | 156.24 | 2540 | 156.07 | 1368 | 156.01 | 542 | 155.99 | 2890 |
| Ratio of peak total area | b/a | 0.24 | | 0.15 | | 0.04 | | 0.24 | |
| | c/a | 0.67 | | 0.25 | | 0.13 | | 0.68 | |
| | (b+c)/a | 0.90 | | 0.40 | | 0.18 | | 0.92 | |
| Catalytic activity (µmol/hr) | | 10.7 | | 5.4 | | 1.3 | | 4 | |

Samples Nos. 1, 19, and 18 are examples of the present invention, and
Sample No. 6 is a comparative example.

As shown in FIG. 2 and Table 4, the XPS spectra of the Bi-4f inner shell level of the titanium oxide-based photocatalyst of Samples Nos. 1, 19, and 18 according to the present invention had all of the above-described three groups of paired peaks (a)-(c). This provides support for the presence of bismuth with lower valences ($Bi^{2+}$ and $Bi^0$). In addition, the larger the values of the peak area ratios b/a, c/a, and (b+c)/a of the photocatalyst, the higher was the visible light photocatalytic activity. From this fact, it can be seen that there is a clear correlation between the activity of a photocatalyst according to the present invention and the above-described peak areas in the XPS spectrum of the Bi-4f inner shell level.

The XPS spectrum of Sample No. 6, which was a comparative example, also had all of the above-described 3 groups of paired peaks (a)-(c), so the presence of bismuth with lower valences was observed. However, it did not contain silicon, and its activity was inferior to that of a photocatalyst according to the present invention.

EXAMPLE 5

The titanium oxide-based photocatalyst according to the present invention prepared in Sample No. 1 of Example 1 was pulverized and then dispersed in waters and the dispersion was applied to a glass plate (16 cm$^2$) and dried to prepare a photocatalytic functional member having a layer of a photocatalyst on the surface of the substrate (Sample No. 21).

Separately, a commercially available photocatalyst powder responsive to ultraviolet light (ST-01 manufactured by Ishihara Sangyo) was applied to a glass plate in the same manner as above to prepare a photocatalytic functional member (Sample No. 22).

The photocatalytic activity of these two types of photocatalytic functional members was tested by an acetaldehyde decomposition test by the same method as described in Example 1 except that the conditions of irradiation with light were changed to those shown in Table 5. The results are also shown in Table 5.

TABLE 5

| | | Photocatalytic activity: rate of $CO_2$ formation (µmol/hr)** | |
|---|---|---|---|
| Sample No.* | Photocatalyst | UV (330–370 nm) | Visible light (>420 nm) |
| 21 | Bi/Ti = 0.101 Si/Ti = 0.136 | 12.7 | 4.5 |
| 22 | ST-01 | 10.4 | 0.1 |

*Sample No. 21 was an example of the present invention, and Sample No. 22 was a comparative example.
**UV irradiation used a mercury vapor lamp (filter: MC-350FY, Toshiba), visible light irradiation used a xenon lamp (filter: L42)

As shown in Table 5, a titanium oxide-based photocatalyst according to the present invention maintains the same activity in response to ultraviolet light as a conventional product when irradiated with ultraviolet light. However, whereas the conventional product exhibited substantially no photocatalytic function when irradiated with visible light, the photocatalyst according to the present invention exhibited excellent visible light activity.

EXAMPLE 6

Using zirconium tetrachloride or aluminum trichloride instead of silicon tetrachloride, titanium based photocatalysts according to the present invention containing bismuth and zirconium or aluminum as a second additional metal component was prepared (Samples Nos. 23 and 24). Using these photocatalysts in the same manner as in Example 1, their ability to decompose acetaldehyde in response to visible light was evaluated. The composition and the photocatalytic activity of the photocatalyst are summarized in Table 6.

TABLE 6

| | Photocatalyst composition | | Photocatalytic activity Rate of $CO_2$ formation |
|---|---|---|---|
| Sample No.* | α (=Bi/Ti) | β (=3rd component/Ti) | (µmol/hr) |
| 23 | 0.101 | 0.136 (Zr/Ti) | 6.5 |
| 24 | 0.101 | 0.136 (Al/Ti) | 4.7 |
| 3 | 0 | 0 | 2.4 |

*Samples Nos. 23 and 24 were examples of the present invention, and Sample No. 3 was a comparative example.

As can be seen from Table 6, it was proven that the visible light activity of a titanium oxide-based photocatalyst can be increased even when the second additional metal component is zirconium or aluminum.

EXAMPLE 7

Using a media mill, 20 parts by mass of the titanium oxide-based photocatalyst according to the present invention prepared in Example 1 was added to 80 parts by mass of distilled water along with a suitable amount of an organic dispersing agent and dispersed with the aid of zirconia beads to give a photocatalytic dispersion having a solids content of 20 weight %. The pH of this dispersion was approximately 4.0. The average particle diameter of the titanium oxide-based photocatalyst in this dispersion was measured using a particle size analyzer (LA700, Horiba, Ltd.) and was found to be approximately 60 nm.

This dispersion was placed atop a frosted glass plate, and heat was applied from below the plate to slowly dry the dispersion to prepare a photocatalytic functional member according to the present invention having a photocatalyst film with a coating weight of 5 g/m$^2$ (film thickness of approximately 6 μm). Using this functional member, an acetaldehyde decomposition test was cried out in the same manner as in Example 1. The rate of formation of $CO_2$ was found to be 2.0 μmol per hour.

EXAMPLE 8

A photocatalytic dispersion was prepared in the same manner as for Example 7 except that the dispersing agent was changed to nitric acid. When the particle size of the titanium oxide-based photocatalyst in the dispersion was measured by the same method as described in Example 7, it was found to be approximately 80 nm. To 100 parts by mass of this photocatalytic dispersion, 2.5 parts by mass of an aqueous methyltriethoxysilane solution, 14.7 parts by mass of tetraethoxysilane in liquid form, and 50 parts by mass of ethanol were added, and the resulting mixture was thoroughly stirred for 60 minutes using a paint shaker to prepare a coating composition.

A photocatalytic functional steel sheet was prepared by applying this coating composition to a precoated steel sheet in the following manner. First, a commercially available primer based on a silicone resin is applied to a precoated steel sheet (thickness of 0.3 mm having a polyester coating) to form a primer layer with a thickness of 1.0 μm. Atop this silicone based primer layer, the above-described coating composition was applied using a bar coater (20#) and dried for 2 minutes at 150° C. to provide a photocatalytic functional steel sheet having a film containing a titanium oxide-based photocatalyst according to the present invention. The thickness of the film was approximately 2.0 μm. Using this photocatalytic functional steel sheet, an acetaldehyde decomposition test was carried out in the same manner as in Example 1. The rate of formation of $CO_2$ was 0.8 μmol per hour.

Using this sample, the ability to make the surface of the steel sheet hydrophilic in response to irradiation with visible light was evaluated. Irradiation with visible light was carried out using white light from a fluorescent lamp as a light source through a UV filter which was a commercially available acrylic sheet (LF39 prepared by Sumitomo Chemicals). The light intensity was 15,000 lux. The extent of increase in hydrophilicity was evaluated by measuring the contact angle between water and the surface of the steel sheet. The contact angle of water was approximately 50° before irradiation with visible light, but it decreased to approximately 10° after 24 hours of irradiation with visible light.

From the above, it can be seen that if a photocatalytic functional member according to the present invention is irradiated with visible light, it not only exhibits photocatalytic decomposing activity but also provides a high level of hydrophilicity.

The invention claimed is:

1. A titanium oxide-based photocatalyst comprising titanium oxide containing bismuth as a first additional metal elemental component and at least one metal element selected from silicon, zirconium, aluminum, and hafnium as a second additional metal elemental component wherein the photocatalyst has a metallic atomic ratio α of bismuth, which is the first additional metal component, to titanium (α=Bi/Ti) of at least 0.0001 and at most 1.0 and a metallic atomic ratio β of the second additional metal component to titanium (β=second additional metal/Ti) of at least 0.0001 and at most 0.8, said photocatalyst containing bismuth and the second metal elemental component both in the form of a complex oxide with titanium oxide.

2. The titanium oxide-based photocatalyst as set forth in claim 1, wherein the titanium oxide further contains at least 0.0005 weight % and at most 1.0 weight % of nitrogen.

3. The titanium oxide-based photocatalyst as set forth in claim 1, wherein the second additional metal component is silicon.

4. The titanium oxide-based photocatalyst as set forth in claim 1, wherein an x-ray diffraction pattern of a sample obtained by heat treatment at 600° C. of the titanium oxide-based photocatalyst itself or a precursor thereof has substantially no peak assigned to rutile crystals of titanium oxide.

5. The titanium oxide-based photocatalyst as set forth in claim 1, wherein at least a portion of the titanium oxide is in the form of anatase crystals, and the crystallite size of the anatase crystals calculated from an x-ray diffraction peak of the crystals is at most 20 nm.

6. The titanium oxide-based photocatalyst as set forth in claim 1, wherein the photocatalyst has a Bi-4f inner shell level spectrum obtained by XPS analysis that has paired peaks located in at least two of regions (a) 165-162.5 eV and 159.7-157.2 eV, (b) 163-161 eV and 157.7-155.7 eV, and (c) 162.5-160 eV and 157.2-154.7 eV.

7. The titanium oxide-based photocatalyst as set forth in claim 6, wherein the spectrum obtained by XPS has a value of the peak area ratio (b+c)/a of at least 0.15 wherein the total areas of the groups of paired peaks in each of regions (a), (b), and (c) are respectively a, b, and c.

8. The titanium oxide-based photocatalyst as set forth in claim 7, wherein the spectrum obtained by XPS has a value of the ratio b/a of at least 0.05.

9. The titanium oxide-based photocatalyst as set forth in claim 7, wherein the spectrum obtained by XPS has a value of the ratio c/a of at least 0.1.

10. The titanium oxide-based photocatalyst as set forth in claim 6, wherein the spectrum obtained by XPS has a group of paired peaks in each of regions (a), (b), and (c).

11. The titanium oxide-based photocatalyst as set forth in claim 1, wherein at least a portion of bismuth is present as $Bi^{2+}$ or $Bi^0$.

12. A method for preparing a titanium oxide-based photocatalyst as set forth in claim 1, comprising the steps of:
(a) mixing a titanium oxide precursor compound with a bismuth compound which is a source of a first additional metal component and at least one compound which is a source of a second additional metal component selected from silicon, zirconium, aluminum, and hafnium, wherein at least one of these compounds is hydrolysable, (b) hydrolyzing the hydrolysable compound, and (c) subjecting the mixture containing a hydrolysate of a hydrolysable compound obtained after steps (a) and (b) to heat treatment, wherein either of steps (a) and (b) may be performed first or they may be performed simultaneously.

13. The method as set forth in claim 12, wherein the mixture containing a hydrolysate which is subjected to heat treatment in step c) contains at least 0.1 weight % of nitrogen on a dry basis.

14. The method as set forth in claim 12, wherein step (b) is performed after step (a).

15. The method as set forth in claim 12, wherein the hydrolysis in step (b) is carried out using a base.

16. The method as set forth in claim 15, wherein the base is ammonia.

17. The method as set forth in claim 12, wherein the heat treatment is carried out in a temperature range of 400-700° C.

18. A photocatalytic functional member having the titanium oxide-based photocatalyst as set forth in claim 1 on the surface of a substrate.

19. The photocatalytic functional member as set forth in claim 18, wherein the substrate primarily comprises a metal.

20. A method of decomposing or removing a substance comprising the step of contacting a substance to be disposed of with the photocatalytic functional member as set forth in claim 18 under irradiation with light including visible light rays to decompose and/or remove the substance.

21. A photocatalytic functional member having a coating containing the titanium oxide-based photocatalyst as set forth in claim 1 and a binder component on the surface of a substrate, wherein the amount of the photocatalyst in the coating is 5-95 weight %.

22. A photocatalytic dispersion having the titanium oxide-based photocatalyst as set forth in claim 1 dispersed in a liquid medium.

23. A photocatalytic coating composition prepared using the photocatalytic dispersion as set forth in claim 22.

24. A method of preparing a photocatalytic functional member comprising the step of applying the photocatalytic coating composition as set forth in claim 23 to a substrate.

25. A method of preparing a photocatalytic functional member comprising the step of applying the photocatalytic dispersion as set forth in claim 22 to a substrate.

26. A photocatalytic coating composition containing the titanium oxide-based photocatalyst as set forth in claim 1 and a binder in a liquid medium, wherein the amount of the titanium oxide-based photocatalyst is 5-95 weight % based on the total amount of non-volatile components in the composition.

27. A method of decomposing or removing a substance comprising the step of contacting a substance to be disposed of with the titanium oxide-based photocatalyst as set forth in claim 1 under irradiation with light including visible light rays to decompose and/or remove the substance.

28. The method as set forth in claim 27, wherein the substance to be disposed of is a harmful substance.

29. The titanium oxide-based photocatalyst as set forth in claim 1, which is prepared by a process comprising mixing a titanium oxide precursor compound with a bismuth compound, which is a source of a first additional metal component and at least one compound, which is a source of a second additional metal component selected from silicon, zirconium, aluminum, and hafnium, wherein at least one of these compounds is hydrolysable and hydrolyzing the hydrolysable compound.

* * * * *